(12) United States Patent
Li et al.

(10) Patent No.: US 10,961,064 B2
(45) Date of Patent: Mar. 30, 2021

(54) GRAIN STOREHOUSE AND GRAIN LOADING METHOD THEREOF

(71) Applicant: HEFEI UNIVERSITY OF TECHNOLOGY, Hefei (CN)

(72) Inventors: Xinyu Li, Hefei (CN); Shouxu Song, Hefei (CN); Zunyou Yao, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 16/693,398

(22) Filed: Nov. 25, 2019

(65) Prior Publication Data

US 2020/0180879 A1 Jun. 11, 2020

(30) Foreign Application Priority Data

Dec. 5, 2018 (CN) .......................... 201811479508.9

(51) Int. Cl.
*B65G 65/34* (2006.01)
*B65D 88/54* (2006.01)
*B65G 65/30* (2006.01)
*B65G 3/04* (2006.01)

(52) U.S. Cl.
CPC .......... *B65G 65/34* (2013.01); *B65D 88/546* (2013.01); *B65G 3/04* (2013.01); *B65G 65/30* (2013.01); *B65G 2201/042* (2013.01)

(58) Field of Classification Search
CPC ...... B65G 65/30; B65G 65/34; B65G 65/466; B65G 3/04; B65G 2201/042; B65D 88/546; B65D 88/005; E04H 7/22

USPC ................... 414/303, 288, 293; 52/192, 197
See application file for complete search history.

(56) References Cited

U.S. PATENT DOCUMENTS

| | | | | |
|---|---|---|---|---|
| 1,398,211 | A * | 11/1921 | Wallace | B65G 65/34 414/303 |
| 4,563,844 | A * | 1/1986 | Driedger | E04H 7/26 52/192 |
| 7,392,624 | B2 * | 7/2008 | Kinzer | B65D 88/022 52/192 |
| 2013/0164112 | A1 * | 6/2013 | Oren | B65G 65/32 414/802 |
| 2019/0316294 | A1 * | 10/2019 | Medoff | B65G 53/40 |
| 2020/0071096 | A1 * | 3/2020 | Kaeb | B65G 21/02 |

FOREIGN PATENT DOCUMENTS

| | | |
|---|---|---|
| CN | 104692082 A | 6/2015 |
| CN | 105084028 A | 11/2015 |
| CN | 207275417 U | 4/2018 |

* cited by examiner

*Primary Examiner* — James R Bidwell
(74) *Attorney, Agent, or Firm* — Hemisphere Law, PLLC; Zhigang Ma (57) ABSTRACT

A grain storehouse includes a granary, a grain loading system, and a grain unloading system. The granary includes multiple storages arranged in a network format. The bottom of each storage is a tapered structure with a tapered surface downward, and the bottom of the tapered structure provides a switchable blanking exit. The grain loading system includes a lattice girder structure, a plurality of conveyors and multiple hoppers. The grain unloading system includes at least one conveyor that is located under the blanking exit. The present invention improves the automaticity and efficiency of grain loading and unloading of the grain storehouse, so that the grain can be transferred quickly.

18 Claims, 7 Drawing Sheets

GRAIN STOREHOUSE AND GRAIN LOADING METHOD THEREOF

FIELD OF THE INVENTION

The present invention relates to grain storehouse and grain loading methods thereof, and more particularly to an automated grain loading and unloading grain storehouse and grain loading method there.

BACKGROUND OF THE INVENTION

Currently, grain storehouse is the main way to storage grain in China. Now, most of the grain storehouses are delivered by mobile transporters and loaders. During the process of loading and unloading, it is necessary to move the mechanical equipment frequently in the grain storehouse. This leads to heavy workload for laborers, more dust in the workplace, a bad work circumstance, a lot of idle time of mechanical equipment, and low operating efficiency, which greatly reduces the automation of grain loading and unloading of the grain storehouse. Therefore, the traditional grain storehouse has the problems which include low automation of loading and unloading, heavy laboring intensity and high operating costs, these make it difficult to transport the grain in a short time and cannot satisfy the demand for grain storage.

SUMMARY OF THE INVENTION

In response to the problems of the traditional technology, the present invention provides a grain storehouse and grain loading method thereof, so as to alleviate the problems of low automation degree, high labor intensity and high operation cost of the traditional grain storehouse, difficult transfer of grain into the grain storehouse in a short time, and the unsatisfied demand of traditional grain storage.

Therefore, the object of the present invention is to provide a grain storehouse. The grain storehouse includes a granary, a grain loading system and a grain unloading system. The granary has multiple storages arranged in a network format used to store grain. The bottom of the storage is a tapered structure with a tapered surface downward, and the bottom of the tapered structure defines a switchable blanking exit. The grain loading system includes a lattice girder structure, a plurality of conveyors which correspond to multiple storages, and a plurality of hoppers that correspond to multiple conveyors. The lattice girder fixes on the granary and is located above multiple storages. More than one conveyors are arranged in line and installed on the lattice girder structure, and forming at least one path for transferring grain. Each hopper is located under the one end of the corresponding conveyor for catching the grain which transferred by the corresponding conveyor, and then put the grain to the corresponding storage or the adjacent conveyor. The grain unloading system includes at least one conveyor that is located under the blanking exit. When the grain storehouse begins to load the grain, all the blanking exits will close. The grain pass through the grain loading system and fill the multiple storages in sequence. When the grain storehouse starts to unload the grain, the corresponding blanking exit will open. The grain of each storage will flow out from the blanking exit to the conveyor. The hopper is a kind of steering hopper, which is rotationally installed on one end of the corresponding conveyor. The steering hopper rotates to unload the grain to the corresponding storage or the adjacent conveyor. Multiple conveyors include a plurality of fixed conveyors and a plurality of moving conveyors. The grain loading system includes multiple parallel guide rails which are installed on the lattice girder structure. A plurality of fixed conveyors are set on the same side of all guide rails, and are successively connected to form a loading path parallel to the guide rails. Each guide rail installs at least one moving conveyor which perpendicular to the guide rail, and the moving conveyor moves in the direction of the corresponding guide rail. When the grain loading system loads grain into one of the storages under multiple fixed conveyors, the grain loading system transports the grain to the steering hopper close to the storage through at least one fixed conveyor, so as to rotate the steering hopper and unload the grain to the storage.

In the grain storehouse of the present invention, the granary is equipped with a honeycomb structure, wherein a plurality of storages are separated by multiple walls to form the honeycomb structure.

In the grain storehouse of the present invention, the conveyor is retractable, and the grain at the front end of the conveyor is transmitted to the rear end of the corresponding conveyor through the transmission of the corresponding conveyor. When the conveyor is on the extended sate, the front end of the conveyor is located below the adjacent hopper. When the conveyor is on the constrictive sate, the front end of the conveyor is deviates from the bottom of the adjacent hopper, so that the grain in the adjacent hopper is unloaded into the corresponding storage.

In the grain storehouse of the present invention, there is only one grain loading path and it is the shortest path passing through all the storages. One end of the grain loading path is the entrance of the grain. From the one end of the grain loading path to the other end, the grain loading system fills all the storages in turn.

In the grain storehouse of the present invention, when the grain loading system loads grain into one of the storages under the multiple moving conveyors, the grain loading system first transmits the grain to the steering hopper close to the storage and installed on the fixed conveyor through at least one fixed conveyor, and at least one moving conveyors is used to convey grain to the steering hopper corresponding to the storage, so as to rotate the steering hopper corresponding to the storage and discharge grain into the storage.

In the grain storehouse of the present invention, further includes a real-time monitoring system which includes a plurality of temperature. At least one temperature and humidity sensor are installed at the middle and bottom of the inner wall of each storage. At least three temperature and humidity sensors are arranged in each storage along the center line direction of the storage, and the three temperature and humidity sensors are respectively located at the bottom, middle and top of the storage. The temperature and humidity sensor is used to detect the temperature and humidity of the inner wall and the center line of the storage.

In the grain storehouse of the present invention, the real-time monitoring system further includes at least one gas sensor. The gas sensor is installed on the top of the inner wall of the storage, and is located above the grain after the storage is filled with grain. The gas sensor is used to detect the gas information in the storage.

In the grain storehouse of the present invention, the grain unloading system also includes a plurality of motors that corresponding to the multiple blanking exits, a plurality of gears that installed in the multiple motor output shafts, a plurality of lead screws that connected to the multiple gears, and a plurality of unloading switches that connected to the multiples lead screws. The unloading switches are in their corresponding blanking exits. The motor rotates to drive the corresponding gear, and drives the corresponding unloading switch to open or close the blanking exit through the lead screw.

The another object of the present invention provides another grain storehouse, it includes a granary, a grain loading system and a grain unloading system. The granary has multiple storages arranged in a network format. Each storage is used to store grain. The bottom of each storage is a tapered structure with a tapered surface downward, and the bottom of the tapered structure provides a switchable blanking exit. The grain loading system includes a lattice girder structure, a plurality of conveyors which correspond to multiple storages, and a plurality of hoppers that correspond to multiple conveyors. The lattice girder fixes on the granary and is located above multiple storages. More than one conveyors are arranged in line and installed on the lattice girder structure, and forming at least one path for transferring grain. Each hopper is located under the one end of the corresponding conveyor for catching the grain which transferred by the corresponding conveyor, and then put the grain to the corresponding storage or the adjacent conveyor. The grain unloading system includes at least one band carrier that is located under the blanking exit. When the grain storehouse begins to load the grain, all the blanking exit will close. The grain pass through the grain loading system and fill the multiple storages in sequence. When the grain storehouse starts to unload the grain, the corresponding blanking exit will open. The grain of each storage will flow out from the blanking exit to the band carrier. The hopper is a kind of steering hopper, it is rotationally installed on one end of the corresponding conveyor. The steering hopper rotates to unload the grain to the corresponding storage or the adjacent conveyor. Multiple conveyors include a plurality of fixed conveyors and a plurality of moving conveyors. The grain loading system includes multiple parallel guide rails, which are installed on the lattice girder structure. A plurality of fixed conveyors are set on the same side of all guide rails, and are successively connected to form a loading path parallel to the guide rails. Each guide rail installs at least one moving conveyor which perpendicular to the guide rail, and the moving conveyor moves in the direction of the corresponding guide rail. When the grain loading system loads grain into one of the storages under multiple mobile conveyors, the grain loading system transports the grain to the steering hopper through at least one fixed conveyor, the steering hopper is close to the storage and is installed on the fixed conveyor. Then, the grain loading system transports the grain to the steering hopper which corresponds to the storage through at least one mobile conveyor, so as to rotate the steering hopper which correspond to the storage and unload the grain to the storage.

In the grain storehouse of the present invention, the granary is equipped with a honeycomb structure, wherein a plurality of storages are separated by multiple walls to form the honeycomb structure.

In the grain storehouse of the present invention, the conveyor is tractable, and the grain at the front end of the conveyor is transmitted to the rear end of the corresponding conveyor through the transmission of the corresponding conveyor. When the conveyor is extended, the front end of the conveyor is located below the adjacent hopper. When the conveyor is constrictive, the front end of the conveyor is deviates from the bottom of the adjacent hopper, so that the grain in the adjacent hopper is discharged into the corresponding storage.

In the grain storehouse of the present invention, there is only one grain loading path and it is the shortest path passing through all the storages. One end of the grain loading path is the entrance of the grain. The grain loading system fills all the storages in sequence through the one end of the grain loading path to the other end.

In the grain storehouse of the present invention, further includes a real-time monitoring system, which includes a plurality of temperature and humidity sensors. At least one temperature and humidity sensor is installed at the middle and bottom of the inner wall of each storage. At least three temperature and humidity sensors are arranged in each storage along the center line direction of the storage, and the three temperature and humidity sensors are respectively located at the bottom, middle and top of the storage. The temperature and humidity sensor is used to detect the temperature and humidity of the inner wall and the center line of the storage.

In the grain storehouse of the present invention, a real-time monitoring system further includes at least one gas sensor. The gas sensor is installed on the top of the inner wall of the storage, and is located above the grain after the storage is filled with grain. The gas sensor is used to detect the gas information in the storage.

The grain storehouse of the present invention further includes a plurality of motors that corresponding to the multiple blanking exits, a plurality of gears that installed in the multiple motor output shafts with a plurality of lead screws that are connected to the multiple gears, and a plurality of unloading switches that are connected to the multiples lead screws. The unloading switches are in their corresponding blanking exits. The motor rotates to drive the corresponding gear, and drives the corresponding unloading switch to open or close the blanking exit through the lead screw.

The present invention provides a method of grain loading, which is applied to any of the above-mentioned grain storehouse. The method of grain loading includes following steps: close all the blanking exits, and fill the storages under all the fixed conveyor in the direction of the loading path; and from one end of the grain loading path to another end, the grain is successively filled into all the storage under the plurality of mobile conveyor through the grain loading system. The method of filling the grain into one of the storages under the mobile conveyor includes following steps: the grain is transported to the steering hopper close to the storage and installed on the fixed conveyor through at least one fixed conveyor; and at least one moving conveyor is used to convey grain to the steering hopper corresponding to the storage, so as to rotate the steering hopper corresponding to the storage and discharge grain into the storage.

In the method of grain loading of the present invention, the conveyor is retractable, and the grain at the front end of the conveyor is transmitted to the rear end of the corresponding conveyor through the transmission of the corresponding conveyor; when the conveyor is in the extended sate, the front end of the conveyor is located below the adjacent hopper; when the conveyor is in the constrictive sate, the front end of the conveyor deviates from the bottom of the adjacent hopper, then the grain in the adjacent hopper is unloaded into the corresponding storage.

In the method of grain loading of the present invention, there is only one grain loading path and it is the shortest path passing through all the storages, one end of the grain loading path is the entrance of the grain; the grain loading system fills all the storages in sequence through the one end of the grain loading path to the other end.

The present invention includes the grain storehouse and the method of grain loading thereof, which has the following beneficial effects.

The present invention divides the existing granary into a plurality of storages, and each of which is independent from each other, so as to prevent the large-scale spread of grain diseases in the granary and ensure the quality of grain. By setting a grain loading system on the top of the storage, and using a plurality of conveyors and a plurality of hoppers to fill a plurality of storages with grain in sequence, the present invention can improve the automation and efficiency of the grain loading, so that the grain can be transported in a short time, at the same time, the manual operation can be avoided, and the health of the operator can be guaranteed, so as to satisfy the demand of the existing grain storage.

In the present invention, the bottom of each storage is a tapered structure, which can facilitate the falling of grain when it is unloading from the grain storehouse. At the same time, it can receive the grain flowing out from the blanking exit through the band carrier of the grain unloading system, which can improve the efficiency of grain unloading from the grain storehouse, and also can avoid manual operation, improve the automation of the unloading, reduce the labor intensity and reduce the operation cost.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

First Embodiment

Please refer to the FIGS. 1-7. The embodiment provides a grain storehouse which includes a granary 1, a grain loading system and a grain unloading system.

Figure 1:
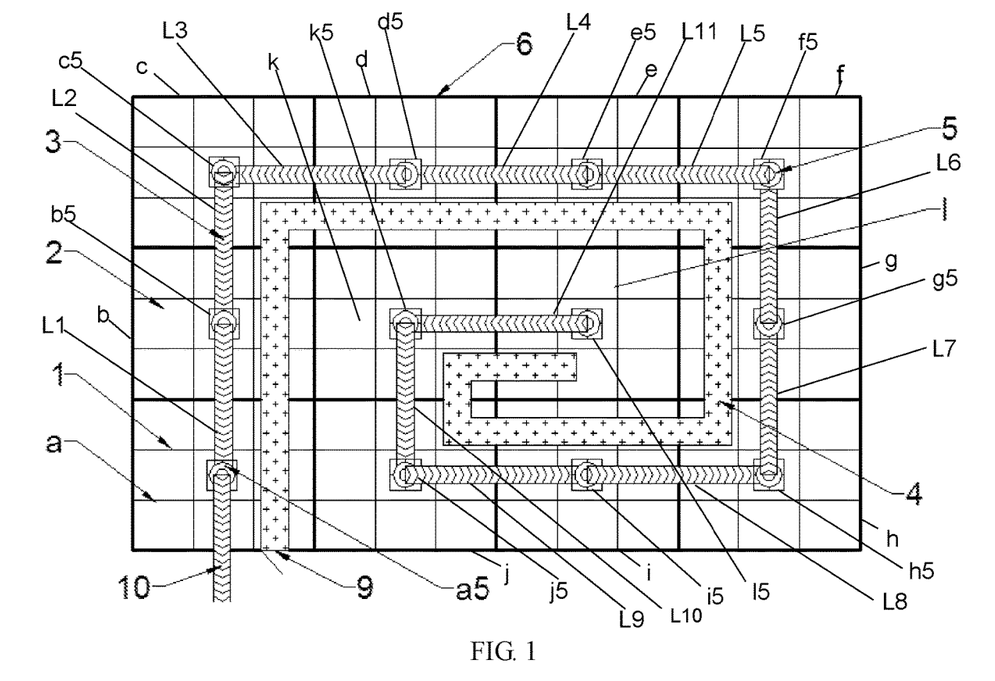
FIG. 1 is a top view of a grain storehouse according to embodiment 1.
Figure 2:
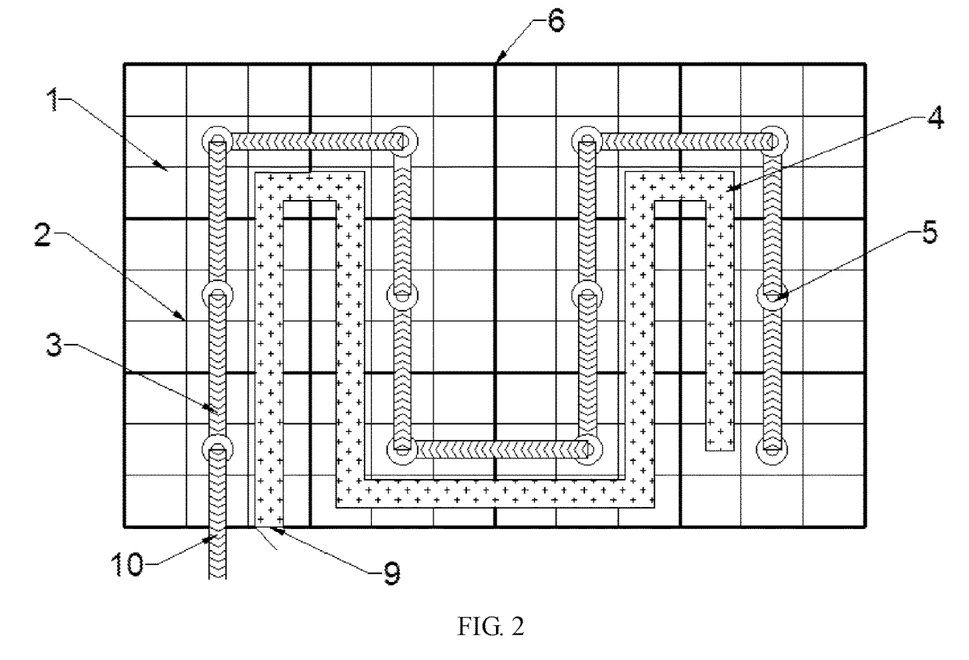
FIG. 2 is a top view of another grain storehouse according to embodiment 1.

The granary 1 has a plurality of storage arranged in a grid format, which means the granary 1 is a grid format granary, and each storage is used for storing grain. The adjacent storages are separated by wall 6, which can be the wall 6 of the existing granary. Each storage is relatively independent from other storages, which can prevent large-scale spread of grain diseases in the granary and ensure the quality of grain. The bottom of each storage is a tapered structure with a tapered surface downward, and the bottom of the tapered structure provides a switchable blanking exit 15. The tapered structure can facilitate the falling of grain and avoid the grain stuck at the bottom corner of the storage. It should be noted that in other embodiments, the grain 1 can have a honeycomb structure, and a plurality of storages are separated by a plurality of walls 6 to form a honeycomb structure. Because of the high density of honeycomb structure, less materials and large available space, it can improve the stability of granaryl, save materials and ensure the storage capacity of granaryl.

The grain loading system includes a lattice girder structure 2, a plurality of conveyors 3, a plurality of hoppers 5. The number of conveyor 3 and hopper 5 are multiple, and the conveyor 3 and hopper 5 correspond one by one. The lattice girder structure 2 is fixed on the granary 1 and is located above the multiple storages. The shape of the lattice girder structure 2 can be the same as the grid shape of the granary 1. The lattice girder structure 2 is installed on the top of the wall 6, which is convenient to install the lattice girder structure 2. A plurality of conveyors 3 are arranged in a linear form and are installed on the lattice girder structure 2 through the second bracket 11, and at least one loading path is formed for transporting grain. Multiple conveyors 3 can be set according to the arrangement form of the storage, and generally form a linear arrangement, so as to ensure that multiple conveyors 3 can form an integrated conveying structure. Each hopper 5 is located under one end of the corresponding conveyor 3 and installed through the first bracket 8, and is used to receive the grain transported by the corresponding conveyor 3 and unload the grain to the corresponding storage or the adjacent conveyor 3.

Figure 3:
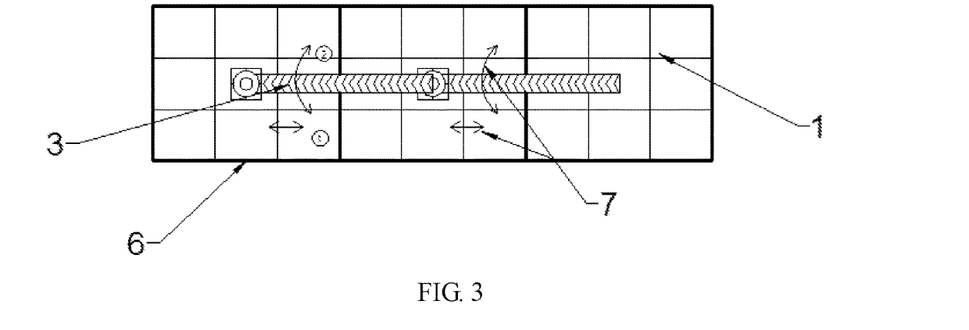
FIG. 3 is a top view of the conversion between two storages of the grain storehouse in FIG. 1.
Figure 4:
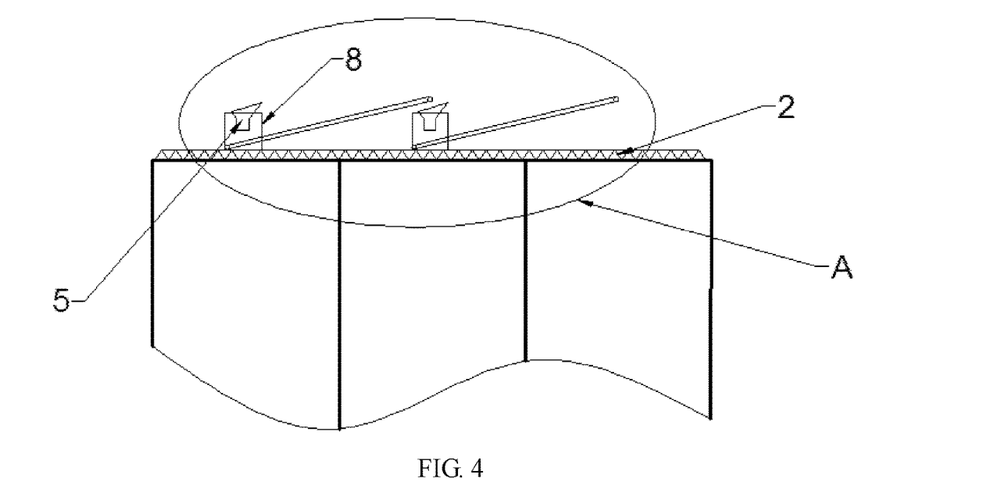
FIG. 4 is a front view of the transition between two storages in FIG. 1.
Figure 5:
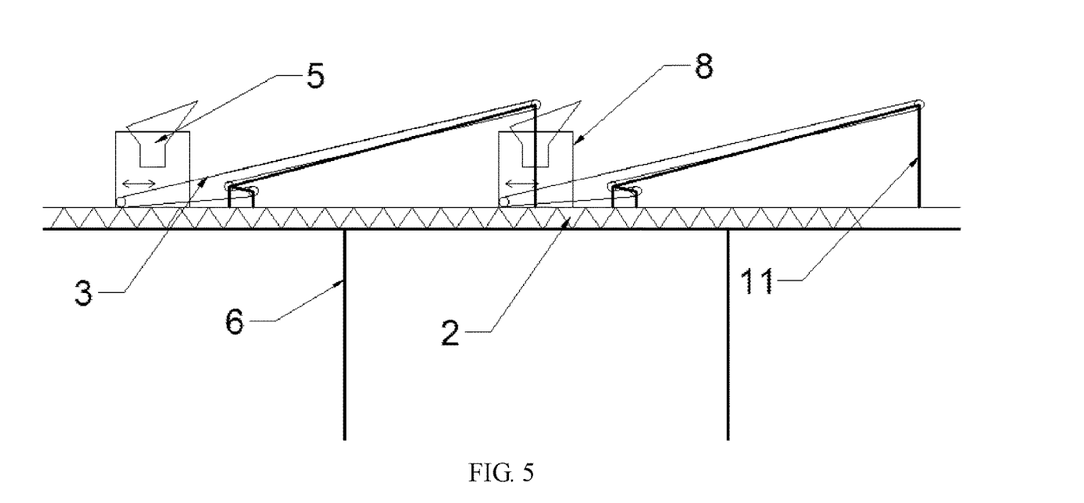
FIG. 5 is an enlarged view of area A in FIG. 4.

In present embodiment, the conveyor 3, preferably a retractable conveyor, transports the grain from one end to the other end. The grain at the front end of the conveyor 3 is transported to the rear end of the corresponding conveyor 3 through the corresponding conveyor 3. The conveyor 3 is tilted and its front end is lower than its rear end. When the conveyor 3 is extended, the front end of the conveyor is located below the adjacent hopper 5. When the conveyor 3 is constrictive, the front end of the conveyor 3 is deviates from the bottom of the adjacent hopper 5, so that the grain in the adjacent hopper 5 is unload into the corresponding storage. In this way, through the retractable conveyor 3, the corresponding storage can be unloaded, so that the grain can be loaded into the storage 1, and the storage 1 that needs to be unloaded can be supplemented according to the demands, so as to realize the function of storage 1 replenishment.

Figure 6:
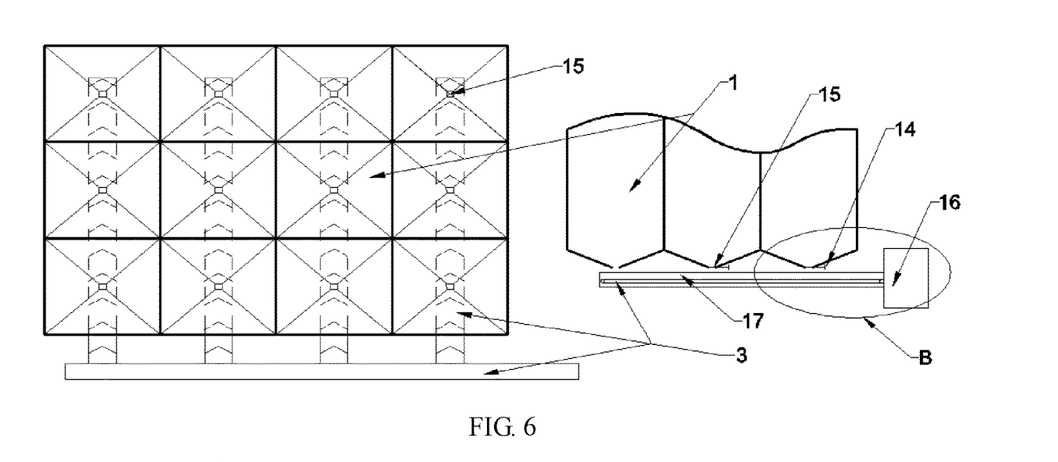
FIG. 6 is a schematic diagram of the grain storehouse for grain unloading in FIG. 1.
Figure 7:
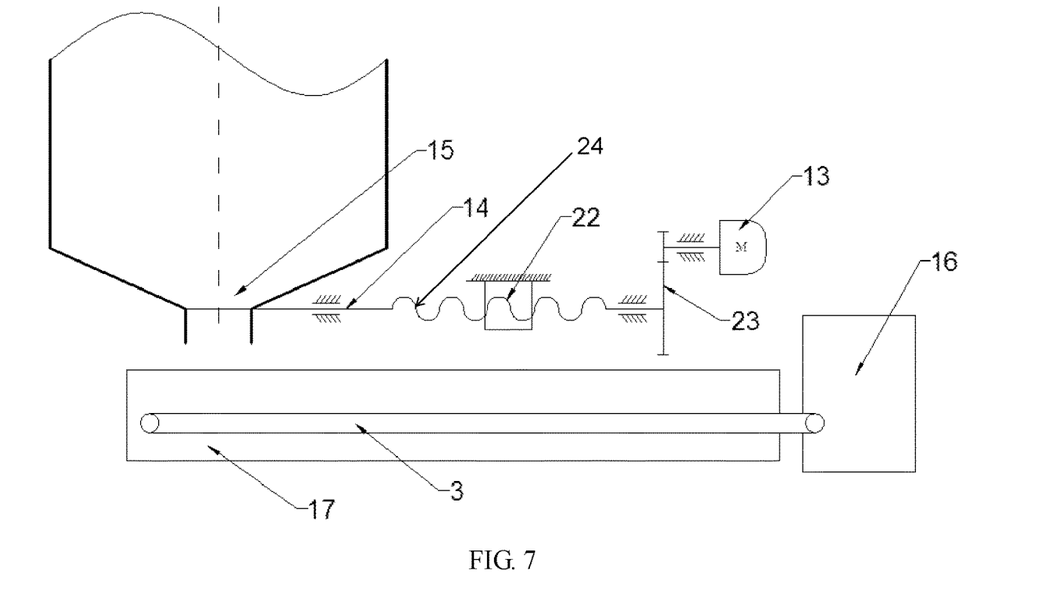
FIG. 7 is an enlarged schematic diagram of the bottom of the grain storehouse in FIG. 1.

The grain unloading system includes at least one band carrier 24, a plurality of motor 13, a plurality of gear 23, a plurality of lead screw 22 and a plurality of unloading switch 14. The band carrier 24 is located under the blanking exit 15. The number of the band carrier 24 can be one or more, but the number of the motor 13, gear 23, lead screw 22 and unloading switch 14 are multiple and one-to-one correspondence. Each motor 13 corresponds to a blanking exit 15, and the gear 23 is installed on the output shaft of the corresponding motor 13. The lead screw 22 is connected to the corresponding gear 23, and the unloading switch 14 is connected with the corresponding lead screw 22. The unloading switch 14 is in the corresponding blanking exit 15. The motor 13 rotates to drive the corresponding gear 23, and drives the corresponding unloading switch 14 to open or close the blanking exit 15 through the lead screw 22.

The bottom of the granary 1 is tapered, which is convenient for grain to use its own weight to unload. At the same time, it is noted that too large taper is not good for the unloading switch 14 at the apex of the cone, and too small taper will lead to residual grain. The degree of the apex of the cone can be between 140° and 150°, which can not only benefit unloading, but also make use of the two cones for better bearing. The unloading operation and flow of the blanking exit 15 are controlled by the control system through the motor 13. The groove 17 is located under the blanking exit 15 of the longitudinal grid granary 1, and the band carrier 24 is arranged in the groove 17.

The specific process of unloading operation is as follows: when the grain in granary 1 needs to unload, first operate the control system to run the motor 13; the motor 13 turns on the unloading switch 14 through the gear 23 and the lead screw 22. So that the blanking exit 15 begins to unload the grain. Because the groove 17 is located under the blanking exit 15, and the band carrier 24 is arranged in the groove 17. The grain from the blanking exit 15 is transported by the band carrier 24 in the groove 17. Then, the grain is screened and cleaned by vibrating screen 16, and finally loaded out. The control system can adjust the opening and closing of the unloading switch 14 and the falling flow of grain by controlling the turning direction and the working time of the motor 13.

When the grain is loaded into the grain storehouse, the blanking exit 15 is closed, and the grain passes through the grain loading system and fills multiple storages successively through the grain loading path. When the grain is unloaded from the grain storehouse, the blanking exit 15 is opened, and the grain in each storage is flowed out from the blanking exit 15 to the band carrier 24. In the present embodiment, by setting a grain loading system on the top of the granary 1, and using multiple conveyors 3 and multiple hoppers 5 to successively fill multiple storages with grain, the automation and the efficiency of grain loading can be improved. So that the grain can be transported in a short time, at the same time, the manual operation can be avoided, and the health of operator can be guaranteed, so as to satisfy the demand of the grain storage. The bottom of each storage is a tapered structure, which can facilitate the falling of grain when it is unloading from the grain storehouse. At the same time, it can receive the grain flowing out from the blanking exit 15 through the band carrier 24 of the grain unloading system, which can improve the efficiency of grain unloading from the grain storehouse, and also can avoid manual operation, improve the automation of the unloading, reduce the labor intensity and reduce the operation cost.

There is only one grain loading path and it is the shortest path passing through all the storages. When selecting the loading path, it can be set according to the grid shape of granary 1, so as to ensure that the loading path passes over all the storages and which is the shortest loading path. One end of the grain loading path is defined as the entry end of grain. When grain is load into the granary 1, there are two ways. One way is from one end of the grain loading path to the other end, the grain loading system fills all storages in turn. The other way is from the other end of the grain loading path to one end, the grain feeding system fills all storages in sequence. The two directions of grain loading are different, the former is from the beginning of the path to fill the storage, and keeps filling until the end of the path, the latter is the opposite. In the actual mechanical process, some storages may be not full of grain. The solution for this situation is to replenish from the storage that needs to be filled with grain.

In some embodiments including the present embodiment, the grain loading system is also provided with an inspection maintenance access 4. The inspection maintenance access 4 is located on one side of the grain loading path, which is closed by the gated access 9, and the maintenance personnel maintain the conveyer 3 and hopper 5 by walking on the inspection maintenance access 4. The width of inspection maintenance access 4 can be set according to the body width of the maintenance personnel, so as to ensure that the maintenance personnel can walk freely in the inspection maintenance access 4. Meanwhile, the distance between the inspection maintenance access 4 and the loading path should also ensure that the maintenance personnel can reach the conveyor 3 and hopper 5.

In present embodiment, unlike the traditional integrated grain storehouse, the traditional grain storehouse is constructed into the structural form of the granary 1. The floor area of each storage is related to the grid shaped grain pile scattered area according to different grain dropping height, so that the grain can fully and quickly fill each storage. The present embodiment introduces a specific structure of a grain storehouse.

The length, width and height of granary 1 are 6 m, 5 m and 12 m respectively. Conveyor 3 is installed on the lattice girder structure 2. Conveyor 3 passes through each storage and is arranged in a spiral layout. In present embodiment, the whole granary 1 is divided into 3*4 grids, and all granaries are sequentially arranged into a, b, c, . . . , 1 according to the spiral layout. The number of the hopper 5 corresponding to each storage is a5, b5, c5, . . . 15. The two adjacent storages are connected by conveyor 3. The conveyor 3 between storage a and storage b is arranged as L1, the conveyor 3 between storage b and storage c is arranged as L2, and the conveyor 3 between storage c and storage d is arranged as L3. Finally, all conveyors 3 are arranged as L1-L11. The controller is used to control the operation of conveyor 3. There are three kinds of operating conditions: starting from the outermost storage, starting from the innermost storage and replenishing the middle storage.

In the first situation, if loading the outermost storage a, the grain will enter the grid format granary 1 from the grain inlet 10, and enter the granary 1 along the spiral path. At this time, operating the controller to disconnect the conveyor L1, it is not connected to the lower part of the outermost hopper a5. In this way, the transported grain will be loaded into the outermost storage preferentially and will not enter the rear storage. Use chart 1 to display the operation of the controller, where x indicates that the conveyor 3 is off and √ indicates on.

CHART 1

| | | | | First status table of conveyor | | | | | | |
|---|---|---|---|---|---|---|---|---|---|---|
| L1 | L2 | L3 | L4 | L5 | L6 | L7 | L8 | L9 | L10 | L11 |
| x | x | x | x | x | x | x | x | x | x | x |

When the outermost storage is full, operating controller to connect the conveyor 3 at this time. Even if the conveyor L1 is connected to the lower part of the outermost hopper a5, the grain will be loaded into the storage b along the conveyor L1. Use chart 2 to display the operation of the controller when loading storage b.

CHART 2

| | | | | Second status table of conveyor | | | | | | |
|---|---|---|---|---|---|---|---|---|---|---|
| L1 | L2 | L3 | L4 | L5 | L6 | L7 | L8 | L9 | L10 | L11 |
| ✓ | x | x | x | x | x | x | x | x | x | x |

Connecting the conveyor L2 after the storage b is full, and continuing to load the storage c. in this way, the grain transported in will be continuously transported and loaded down until the innermost storage 1 is filled, and finally the automatic warehousing operation task is completed. Chart 3 indicates the operation of the conveyor 3 controller when filling the granary 1.

CHART 3

| | | | | Last status table of conveyor | | | | | | |
|---|---|---|---|---|---|---|---|---|---|---|
| L1 | L2 | L3 | L4 | L5 | L6 | L7 | L8 | L9 | L10 | L11 |
| ✓ | ✓ | ✓ | ✓ | ✓ | ✓ | ✓ | ✓ | ✓ | ✓ | ✓ |

It should be pointed out that the motion pattern 7 of the conveyor 3 with or without switching on is various. Further refer to the FIG. 3, the retractable conveyor can be chosen, that is, switching on or off the translational motion pattern ①. Also, the rotary motion pattern ② can be selected to switch on or off, and you can select the general conveyor 3. In addition, the hopper 5, as the structure to receive the grain transported from the upper conveyor 3, can be designed as a inclined hopper 5 according to the grain movement track, so as to better receive the grain to prevent scattering. The hopper 5 can be designed as the upper and lower circles, upper and lower structures. At the same time, in order to avoid excessive dust during loading, a hose (not shown in the figure) is attached to the bottom of the last unloading hopper 5. The hose reaches the bottom of the granary 1 directly, and the length of the hose can be adjusted by controlling as the height of the grain pile increases. When loading from the outside to the inside, all level of conveyors 3 is in the off situation in advance.

In the second case, it will be opposite to the first situation if selecting the innermost storage 1 to be filled first. The grain enters the grain inlet 10 and then along the spiral path to the storage. Then operating the controller to make all conveyors 3 in the state that means all of them are connected to the storage 1. The grain will be transported all the way to the innermost grid storage 1 for priority loading. Use chart 4 to indicate the operation of the controller when filling the granary 1.

CHART 4

| | | | | First status table of conveyor | | | | | | |
|---|---|---|---|---|---|---|---|---|---|---|
| L1 | L2 | L3 | L4 | L5 | L6 | L7 | L8 | L9 | L10 | L11 |
| ✓ | ✓ | ✓ | ✓ | ✓ | ✓ | ✓ | ✓ | ✓ | ✓ | ✓ |

When the innermost storage 1 is full, operating the controller to disconnect the conveyor L11, even if the conveyor L11 is not connected to the lower part of hopper K5, the grain transported in will not enter the innermost storage L, and choose to load the storage k. Chart 5 shows the operation of the controller when filling the storage k.

CHART 5

| | | | | second status table of conveyor | | | | | | |
|---|---|---|---|---|---|---|---|---|---|---|
| L1 | L2 | L3 | L4 | L5 | L6 | L7 | L8 | L9 | L10 | L11 |
| ✓ | ✓ | ✓ | ✓ | ✓ | ✓ | ✓ | ✓ | ✓ | ✓ | x |

After the storage k is full, the operator turns off the conveyor L10 and continues to load the storage j. The grain will be continuously transported and loaded forward until the outermost storage a is filled, and finally the automated loading task is completed. Chart 6 to indicates the operation of the controller when loading the grid storage a.

CHART 6

| | | | | last status table of conveyor | | | | | | |
|---|---|---|---|---|---|---|---|---|---|---|
| L1 | L2 | L3 | L4 | L5 | L6 | L7 | L8 | L9 | L10 | L11 |
| x | x | x | x | x | x | x | x | x | x | x |

When loading from the inside to the outside, all level of conveyors 3 are turning on in advance.

In the third situation, it is impossible for granary 1 to fill the whole granary 1 at one time. it is necessary to continue loading on the basis of the previous unfinished tasks. In this case, it is necessary to replenish the granary 1. Taking the replenishment of intermediate storage g as an example, the grain enters grain inlet 10, then along the feeding path to the granary 1. Operating controller to turn on the conveyor 3 before the storage g, and disconnecting the conveyor L7 between the storage g and h, that is, the conveyor L1-L6 is in the on state, L7 is in the off state, and the rear conveyor 3 has no effect, so the grain will be transported along the conveyor 3 and be loaded into the storage g instead of being transported back. Chart 7 indicates the operation of the controller when filling the storage g.

CHART 7

| | | | | the status table of conveyor | | | | | | |
|---|---|---|---|---|---|---|---|---|---|---|
| L1 | L2 | L3 | L4 | L5 | L6 | L7 | L8 | L9 | L10 | L11 |
| ✓ | ✓ | ✓ | ✓ | ✓ | ✓ | x | | | | |

In conclusion, the grain storehouse of the embodiment has the following advantages:

The grain storehouse of the embodiment has the advantages of simple structure, easy realization and low cost. Each storage is independent from each other, which can prevent the spread of disease and ensure the grain quality of other granary 1. The equipment has high efficiency and automation, saves labor cost, liberates the operators from the bad working environment, and facilitates the efficient and convenient centralized management of granary.

Second Embodiment

Referring to FIGS. 8-12, another grain storehouse is shown according to another embodiment, which is similar to the grain storehouse in first embodiment. There are only one difference.

Figure 12:
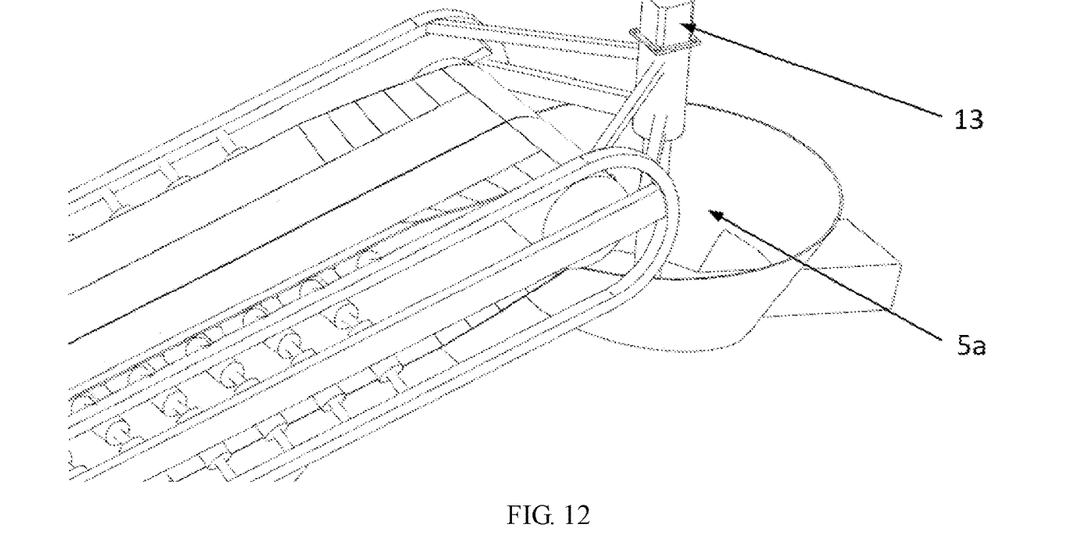
FIG. 12 is a three-dimensional schematic diagram of the steering hopper installed in the mobile conveyor in FIG. 11.

The hopper 5 is a kind of steering hopper 5a, it is rotationally installed on one end of the corresponding conveyor 3. The steering hopper 5a rotates to unload the grain to the corresponding storage or the adjacent conveyor 3.

Figure 8:
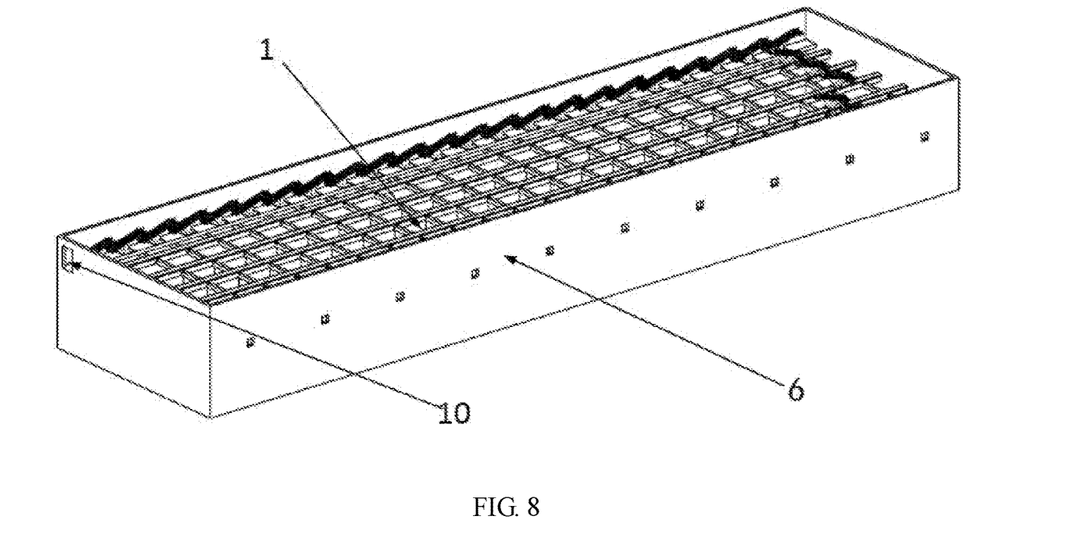
FIG. 8 is a three-dimensional schematic diagram of the grain storehouse according to embodiment 2.
Figure 9:
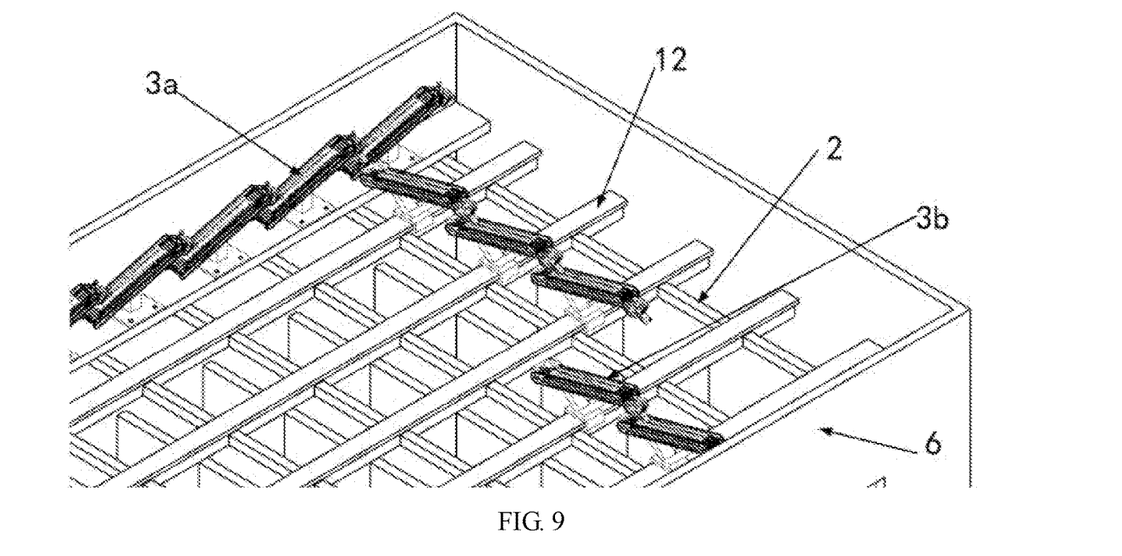
FIG. 9 is a partial enlarged schematic diagram of the grain storehouse in FIG. 8.
Figure 10:
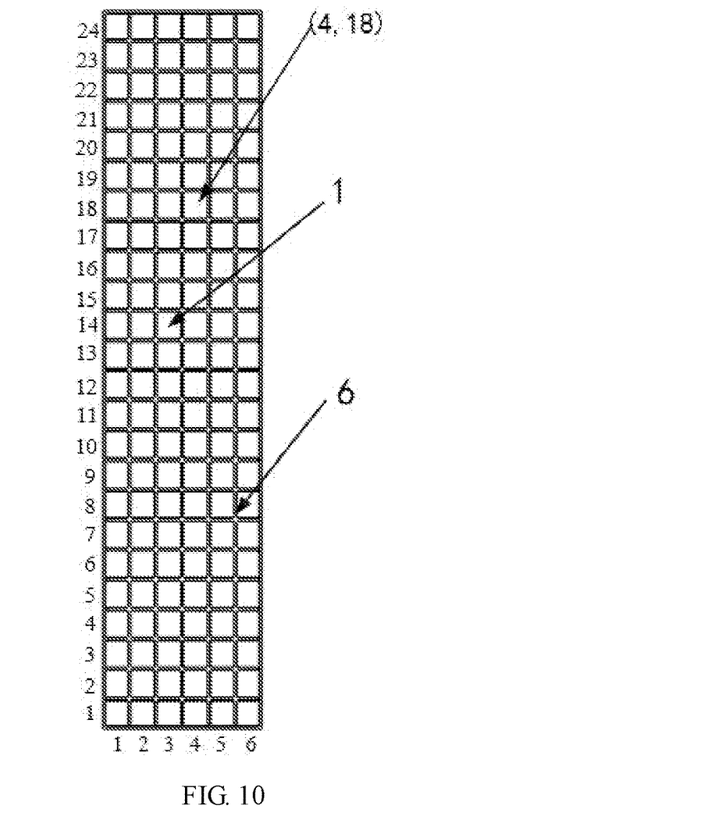
FIG. 10 is a top view of the granary of the grain storehouse in FIG. 8.
Figure 11:
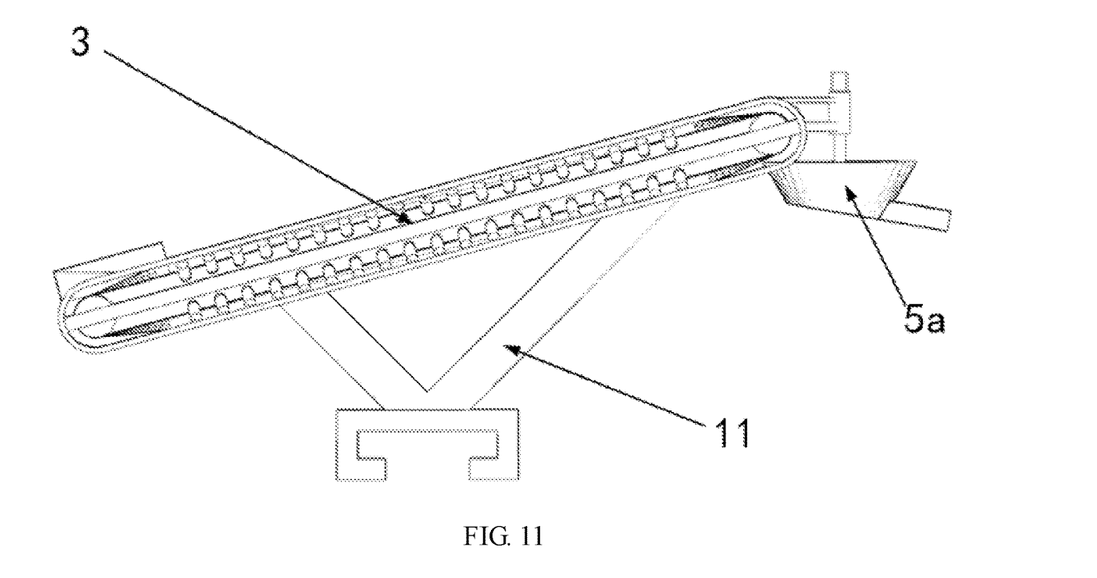
FIG. 11 is a front view of the mobile conveyor of the grain storehouse in FIG. 8.

Multiple conveyors 3 include a plurality of fixed conveyors 3a and a plurality of moving conveyors 3b. The grain loading system includes multiple parallel guide rails 12 which are installed on the lattice girder structure 2. A plurality of fixed conveyors 3a are set on the same side of all guide rails 12, and are successively connected to form a loading path parallel to the guide rails 12. Each guide rail 12 install at least one moving conveyor 3b which perpendicular to the guide rail 12, and the moving conveyor 3b moves in the direction of the corresponding guide rail 12.

In some embodiments, when the grain loading system loads grain into one of the storages under multiple fixed conveyors 3a, the grain loading system transports the grain to the steering hopper 5a close to the storage through at least one fixed conveyor 3a, so as to rotate the steering hopper 5a and unload the grain to the storage.

In other embodiments, when the grain loading system loads into one of the storages under multiple mobile conveyors 3b, the grain loading system transports the grain to the steering hopper 5a close to the storage and is installed on the fixed conveyors 3a through at least one fixed conveyor 3a, and then transports the grain to the steering hopper 5a corresponding to the storage through at least one mobile conveyor 3b, so as to rotate the steering hopper 5a corresponding to the storage and unload the grain to the storage.

In present embodiment, the size of the grid granary 1 is 5 m*5 m*12 m. Because of the bulky grain storehouse, the grain storehouse is constructed into many independent storage structures in this embodiment. The lattice girder structure 2 is installed on the top of the granary 1. The fixed conveyor 3a is located on the lattice girder structure 2 in the direction of longitudinal inner side of the wall 6. The guide rail 12 is fixed on lattice girder structure 2 above the rest of the storage, and the mobile conveyor 3b is installed on the guide rail 12. The front and back parts of the mobile conveyor 3b are located in the center of two adjacent storages, and the back part is a steering hopper 5a. Taking the 24*6 grid granary 1 as an example. The multiple storages of the granary 1 are numbered according to the horizontal axis and the vertical axis. The horizontal axis is correspondingly numbered as 1, 2, 3, 4, 5, 6, and the vertical axis is successively numbered as 1, 2, 3, . . . , 23, 24. There are five rows of guide rails 12 in the middle.

For the first situation, the granary 1 loads the grain from the grain inlet 10. The grain can be transported along the fixed conveyor 3a to the last storage (1,24), and then loaded out step by step; it can also be loaded from the grain inlet 10 to the storage (1,1), and then loaded down step by step.

The two loading sequences can be realized by adjusting the steering hopper 5a at the back of the fixed conveyor 3a through the control system. For example, when loading from the last storage (1,24) step by step, first control the hopper 5a blanking exit at the back of all fixed conveyors 3a to connect to the next fixed conveyor 3a, so that the grain will be transported to the last storage (1,24) after entering from the grain inlet 10.

When the last storage (1,24) is full, controlling the blanking exit of the previous steering hopper 5a to offset the fixed conveyors 3a, so that the grain from the blanking exit falls into the storage (1,23). When the granary 1 is full, it will control the steering hopper 5a to offset the fixed conveyor 3a and directly load the previous storage until the longitudinal grid granary 1 is full.

Another situation is similar to that loading from the grain inlet 10. It should be pointed out that there are two adjustable positions of the steering hopper 5a, docking the fixed conveyor 3a and offsetting to loading directly or connecting the mobile conveyor 3b, and positioning the two positions respectively. When loading directly, to avoid excessive dust, the hose is connected under the steering hopper 5a (not shown in the figure). The hose is directly connected to the bottom of the grid granary 1, and the length of the hose can be adjusted with the increase of the height of the grain pile.

The second situation is to load grain to any grid granary 1. Taking the loading of the storage (4,18) as an example. The grain conveys from the grain inlet 10 and be transported along the fixed conveyor 3a inside the wall 6 of the grid granary 1. The control system makes the steering hopper 5a at the back of the fixed conveyor 3a where the storage (1,18) is located offset to the next fixed conveyor 3a, and then controls the mobile conveyor 3b on the first, second and third rows of guide rails 12 and make them to move respectively between the storage (1,18) and (2,18), and between the storage (2,18), (3,18) and storage (3,18), (4,18), and locate them.

The grain transported by the steering hopper 5a where the storage (1, 18) is located will not fall into the storage (1,18), it will fall into the mobile conveyor 3b between the storage (1,18) and the storage (2,18). The grain will be transported to the storage bin (4,18) for blanking and filling through the mobile conveyor 3b between the storage (2,18), (3,18) and the storage bin (3,18), (4,18). The mobile conveyor 3b on the fourth and fifth row guide rails is not connected.

Therefore, during loading of grid granary 1, it is only necessary to control the direction of the rotation of the fixed conveyor 3a and the hopper 5a, and to assist the mobile conveyor 3b to transport the grain to the target grid of granary 1, and the loading path is like "⌐". The key to realize the embodiment is to adjust and control the steering of hopper 5a and the mobile conveyor 3b by the control system.

Third Embodiment

Figure 13:
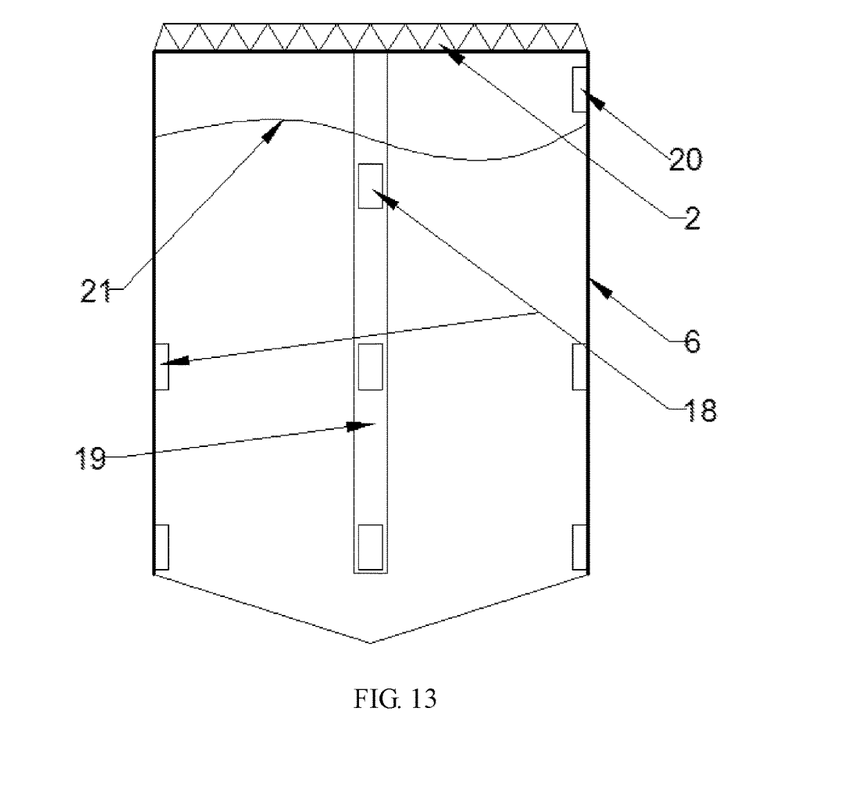
FIG. 13 is the front view of the sensor installed in the grain storehouse of the embodiment 3.
Figure 14:
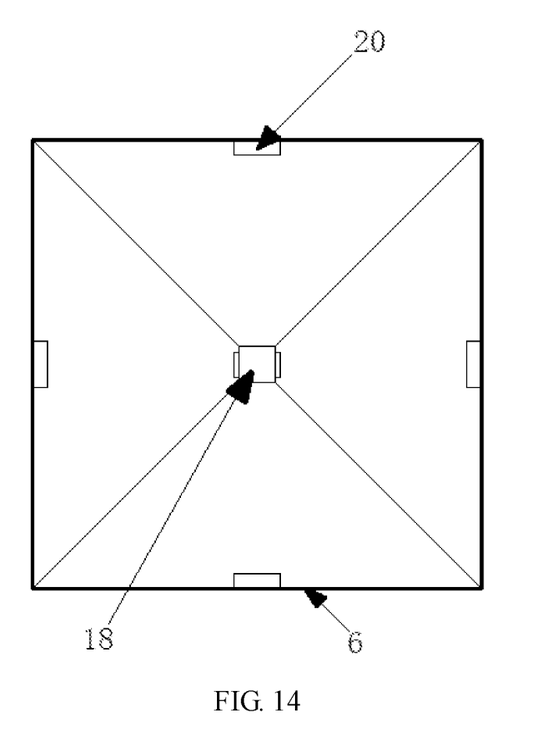
FIG. 14 is the top view of the sensor installed in the grain storehouse in FIG. 13.

Please refer to the FIGS. 13 and 14, the present embodiment provides a grain storehouse, which adds a real-time monitoring system based on the grain storehouse of the first or the second embodiment. The real-time monitoring system includes a plurality of temperature and humidity sensors 18 and at least one gas sensor 20. At least one temperature and humidity sensor 18 are installed at the middle and bottom of the inner wall of each storage. At least three temperature and humidity sensors 18 are located in each storage along the center line direction of the storage. The three temperature and humidity sensors 18 are respectively located at the bottom, middle and top of the storage, and they are installed by lattice girder structure 2 and sensor auxiliary device 19. The gas sensor 20 is installed on the top of the inner wall of the storage, and is located above the grain after the storage is filled with grain, which means it is above the grain pile height line 21. The temperature and humidity sensor 18 is used to detect the temperature and humidity of the inner wall and the center line of the storage, and the gas sensor 20 is used to detect gas information in the storage. Therefore, the temperature and humidity of the grid granary 1 are monitored in real time and treated accordingly.

Fourth Embodiment

The present embodiment provides a method of grain loading, which is applied to the grain storehouse in embodiment 1.

The method of grain loading includes: driving the conveyor 3 to rotate along the grain loading path; loading the grain into the conveyor 3 from one end of the loading path and close all the blanking exits; from one end of the loading path to the other end, the grain is successively filled into all storages through the loading system.

The method of filling one of the storages with grain includes: contracting the conveyor 3 above the unfilled storage and loading the grain into the storage; after filling the corresponding storage, the conveyor 3 above storage is restored, and transporting the grain to the adjacent conveyor 3 through the hopper 5.

Fifth Embodiment

The present embodiment provides a method of grain loading, which is applied to the grain storehouse in embodiment 2.

The method of grain loading includes: closing all the blanking exits, and filling all the storages successively under the fixed conveyors 3a in the direction of the loading path; from one end of the loading path to the other end, the grain is successively filled into all the storages under the multiple mobile conveyor 3b through the loading system.

The method of filling the grain into one of the storages under the mobile conveyor 3b includes: the grain is transported to the steering hopper 5a close to the storage and installed on the fixed conveyor 3a through at least one fixed conveyor 3a, and then transporting the grain to the steering hopper 5a corresponding to the storage through at least one mobile conveyor 3b, so as to make the steering hopper 5a corresponding to the storage rotate and load the grain into the storage.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A grain storehouse, comprising:
   a granary, having multiple storages arranged in a network format used to store grain; the bottom of the storage being a tapered structure with a tapered surface downward, and a switchable blanking exit defined at the bottom of the tapered structure;
   a grain loading system, comprising: a lattice girder structure, a plurality of conveyors which correspond to multiple storages, and a plurality of hoppers that correspond to multiple conveyors; the lattice girder fixed on the granary and located above multiple storages; more than one conveyors arranged in line and installed on the lattice girder structure to form at least one path for transferring grain; each hopper located under the one end of the corresponding conveyor for catching the grain which transferred by the corresponding conveyor, and for putting the grain to the corresponding storage or the adjacent conveyor; and
   a grain unloading system comprising: at least one conveyor that is located under the blanking exit;
   wherein when the grain is started to load into the grain storehouse, all the blanking exits are closed, the grain is passed through the grain loading system and filled the multiple storages in sequence; when the grain is started to unload from the grain storehouse, the corresponding blanking exits are opened; the grain of each storage flow out from the blanking exit to the conveyor;
   the hopper is a kind of steering hopper, which is rotationally installed on one end of the corresponding conveyor; the steering hopper rotates to unload the grain to the corresponding storage or the adjacent conveyor;
   multiple conveyors comprises a plurality of fixed conveyors and a plurality of moving conveyors; the grain loading system comprises multiple parallel guide rails which are installed on the lattice girder structure; a plurality of fixed conveyors are set on the same side of all guide rails, and are successively connected to form a loading path parallel to the guide rails; each guide rail installs at least one moving conveyor which perpendicular to the guide rail, and the moving conveyor moves in the direction of the corresponding guide rail;
   when the grain loading system loads grain into one of the storages under multiple fixed conveyors, the grain loading system transports the grain to the steering hopper close to the storage through at least one fixed conveyor, so as to rotate the steering hopper and unload the grain to the storage.

2. The grain storehouse according to claim 1, wherein the conveyor is retractable, and the grain at the front end of the conveyor is transmitted to the rear end of the corresponding conveyor through the transmission of the corresponding conveyor; when the conveyor is on the extended sate, the front end of the conveyor is located below the adjacent hopper; when the conveyor is on the constrictive sate, the front end of the conveyor is deviates from the bottom of the adjacent hopper, then the grain in the adjacent hopper is unloaded into the corresponding storage.

3. The grain storehouse according to claim 1, wherein there is only one grain loading path and it is the shortest path passing through all the storages, one end of the grain loading path is the entrance of the grain; the grain loading system fills all the storages in sequence through the one end of the grain loading path to the other end.

4. The grain storehouse according to claim 1, wherein when the grain loading system loads grain into one of the storages under the multiple moving conveyors, the grain loading system first transmits the grain to the steering hopper close to the storage and installed on the fixed conveyor through at least one fixed conveyor, and at least one moving conveyors is used to convey grain to the steering hopper corresponding to the storage, so as to rotate the steering hopper corresponding to the storage and discharge grain into the storage.

5. The grain storehouse according to claim 1, further comprising a real-time monitoring system;
   wherein the real-time monitoring system comprises a plurality of temperature and humidity sensors; at least one temperature and humidity sensor is installed at the middle and bottom of the inner wall of each storage; at least three temperature and humidity sensors are arranged in each storage along the center line direction of the storage, and the three temperature and humidity sensors are respectively located at the bottom, middle and top of the storage; the temperature and humidity sensor is used to detect the temperature and humidity of the inner wall and the center line of the storage.

6. The grain storehouse according to claim 5, wherein the real-time monitoring system further comprises at least one gas sensor; the gas sensor is installed on the top of the inner wall of the storage, and is located above the grain after the storage is filled with grain; the gas sensor is installed on the top of the inner wall of the storage, and is located above the grain after the storage is filled with grain; the gas sensor is used to detect the gas information in the storage.

7. The grain storehouse according to claim 5, wherein the grain unloading system further comprises:
a plurality of motors that corresponding to the multiple blanking exits;
a plurality of gears that installed in the multiple motor output shafts;
a plurality of lead screws that connected to the multiple gears; and
a plurality of unloading switches that connected to the multiples lead screws;
the unloading switches are in their corresponding blanking exits; the motor rotates to drive the corresponding gear, and drives the corresponding unloading switch to open or close the blanking exit through the lead screw.

8. A grain storehouse, comprising:
a granary, having multiple storages arranged in a network format used to store grain; the bottom of the storage being a tapered structure with a tapered surface downward, and a switchable blanking exit defined at the bottom of the tapered structure;
a grain loading system, comprising: a lattice girder structure, a plurality of conveyors which correspond to multiple storages, and a plurality of hoppers that correspond to multiple conveyors; the lattice girder fixed on the granary and located above multiple storages; more than one conveyors arranged in line and installed on the lattice girder structure to form at least one path for transferring grain; each hopper located under the one end of the corresponding conveyor for catching the grain which transferred by the corresponding conveyor, and for putting the grain to the corresponding storage or the adjacent conveyor; and
a grain unloading system comprising at least one conveyor that is located under the blanking exit;
wherein when the grain is started to load into the grain storehouse, all the blanking exits are closed, the grain is passed through the grain loading system and filled the multiple storages in sequence; when the grain is started to unload from the grain storehouse, the corresponding blanking exits are opened; the grain of each storage flow out from the blanking exit to the conveyor;
the hopper is a kind of steering hopper, which is rotationally installed on one end of the corresponding conveyor; the steering hopper rotates to unload the grain to the corresponding storage or the adjacent conveyor;
multiple conveyors comprises a plurality of fixed conveyors and a plurality of moving conveyors; the grain loading system comprises multiple parallel guide rails which are installed on the lattice girder structure; a plurality of fixed conveyors are set on the same side of all guide rails, and are successively connected to form a loading path parallel to the guide rails; each guide rail installs at least one moving conveyor which perpendicular to the guide rail, and the moving conveyor moves in the direction of the corresponding guide rail;
when the grain loading system loads grain into one of the storages under multiple mobile conveyors, the grain loading system transports the grain to the steering hopper through at least one fixed conveyor, and the steering hopper is close to the storage and is installed on the fixed conveyor; the grain loading system transports the grain to the steering hopper which correspond to the storage through at least one mobile conveyor, so as to rotate the steering hopper which correspond to the storage and unload the grain to the storage.

9. The grain storehouse according to claim 8, wherein the granary equips a honeycomb structure, which has a plurality of storages are separated by multiple walls to form the honeycomb structure.

10. The grain storehouse according to claim 8, wherein the conveyor is retractable, and the grain at the front end of the conveyor is transmitted to the rear end of the corresponding conveyor through the transmission of the corresponding conveyor; when the conveyor is on the extended sate, the front end of the conveyor is located below the adjacent hopper; when the conveyor is on the constrictive sate, the front end of the conveyor is deviates from the bottom of the adjacent hopper, then the grain in the adjacent hopper is unloaded into the corresponding storage.

11. The grain storehouse according to claim 8, wherein there is only one grain loading path and it is the shortest path passing through all the storages, one end of the grain loading path is the entrance of the grain; the grain loading system fills all the storages in sequence through the one end of the grain loading path to the other end.

12. The grain storehouse according to claim 8, wherein when the grain loading system loads grain into one of the storages under the multiple moving conveyors, the grain loading system first transmits the grain to the steering hopper close to the storage and installed on the fixed conveyor through at least one fixed conveyor, and at least one moving conveyors is used to convey grain to the steering hopper corresponding to the storage, so as to rotate the steering hopper corresponding to the storage and discharge grain into the storage.

13. The grain storehouse according to claim 8, further comprising a real-time monitoring system;
wherein the real-time monitoring system comprises a plurality of temperature and humidity sensors; at least one temperature and humidity sensor is installed at the middle and bottom of the inner wall of each storage; at least three temperature and humidity sensors are arranged in each storage along the center line direction of the storage, and the three temperature and humidity sensors are respectively located at the bottom, middle and top of the storage; the temperature and humidity sensor is used to detect the temperature and humidity of the inner wall and the center line of the storage.

14. The grain storehouse according to claim 13, wherein the real-time monitoring system further comprises at least one gas sensor; the gas sensor is installed on the top of the inner wall of the storage, and is located above the grain after the storage is filled with grain; the gas sensor is installed on the top of the inner wall of the storage, and is located above the grain after the storage is filled with grain; the gas sensor is used to detect the gas information in the storage.

15. The grain storehouse according to claim 8, wherein the grain unloading system further comprises:

a plurality of motors that corresponding to the multiple blanking exits;

a plurality of gears that installed in the multiple motor output shafts;

a plurality of lead screws that connected to the multiple gears; and a plurality of unloading switches that connected to the multiples lead screws;

wherein the unloading switches are in their corresponding blanking exits; the motor rotates to drive the corresponding gear, and drives the corresponding unloading switch to open or close the blanking exit through the lead screw.

16. A method of grain loading, which is applied to a grain storehouse; the grain storehouse comprising:

a granary, having multiple storages arranged in a network format used to store grain; the bottom of the storage being a tapered structure with a tapered surface downward, and a switchable blanking exit defined at the bottom of the tapered structure;

a grain loading system, comprising: a lattice girder structure, a plurality of conveyors which correspond to multiple storages, and a plurality of hoppers that correspond to multiple conveyors; the lattice girder fixed on the granary and located above multiple storages; more than one conveyors arranged in line and installed on the lattice girder structure to form at least one path for transferring grain; each hopper located under the one end of the corresponding conveyor for catching the grain which transferred by the corresponding conveyor, and for putting the grain to the corresponding storage or the adjacent conveyor; and a grain unloading system comprising at least one conveyor that is located under the blanking exit;

wherein when the grain is started to load into the grain storehouse, all the blanking exits are closed, the grain is passed through the grain loading system and filled the multiple storages in sequence; when the grain is started to unload from the grain storehouse, the corresponding blanking exits are opened; the grain of each storage flow out from the blanking exit to the conveyor;

the hopper is a kind of steering hopper, which is rotationally installed on one end of the corresponding conveyor; the steering hopper rotates to unload the grain to the corresponding storage or the adjacent conveyor;

multiple conveyors comprises a plurality of fixed conveyors and a plurality of moving conveyors; the grain loading system comprises multiple parallel guide rails which are installed on the lattice girder structure; a plurality of fixed conveyors are set on the same side of all guide rails, and are successively connected to form a loading path parallel to the guide rails; each guide rail installs at least one moving conveyor which perpendicular to the guide rail, and the moving conveyor moves in the direction of the corresponding guide rail;

when the grain loading system loads grain into one of the storages under multiple fixed conveyors, the grain loading system transports the grain to the steering hopper close to the storage through at least one fixed conveyor, so as to rotate the steering hopper and unload the grain to the storage;

the methods of grain loading comprises:

closing all the blanking exits;

filling the storages under all the fixed conveyor in the direction of the loading path; and from one end of the grain loading path to another end, the grain successively filled into all the storage under the plurality of mobile conveyor through the grain loading system;

wherein the method of filling the grain into one of the storages under the mobile conveyor comprises:

the grain is transported to the steering hopper close to the storage and installed on the fixed conveyor through at least one fixed conveyor; and at least one moving conveyor is used to convey grain to the steering hopper corresponding to the storage, so as to rotate the steering hopper corresponding to the storage and discharge grain into the storage.

17. The method according to claim 16, wherein the conveyor is retractable, and the grain at the front end of the conveyor is transmitted to the rear end of the corresponding conveyor through the transmission of the corresponding conveyor; when the conveyor is on the extended sate, the front end of the conveyor is located below the adjacent hopper; when the conveyor is on the constrictive sate, the front end of the conveyor is deviates from the bottom of the adjacent hopper, then the grain in the adjacent hopper is unloaded into the corresponding storage.

18. The method according to claim 16, wherein there is only one grain loading path and it is the shortest path passing through all the storages, one end of the grain loading path is the entrance of the grain; the grain loading system fills all the storages in sequence through the one end of the grain loading path to the other end.

* * * * *